May 12, 1953 D. H. SPANGLER 2,638,355
STEERING ASSEMBLY FOR TANDEM WHEEL VEHICLES
Filed Nov. 4, 1948 3 Sheets-Sheet 2
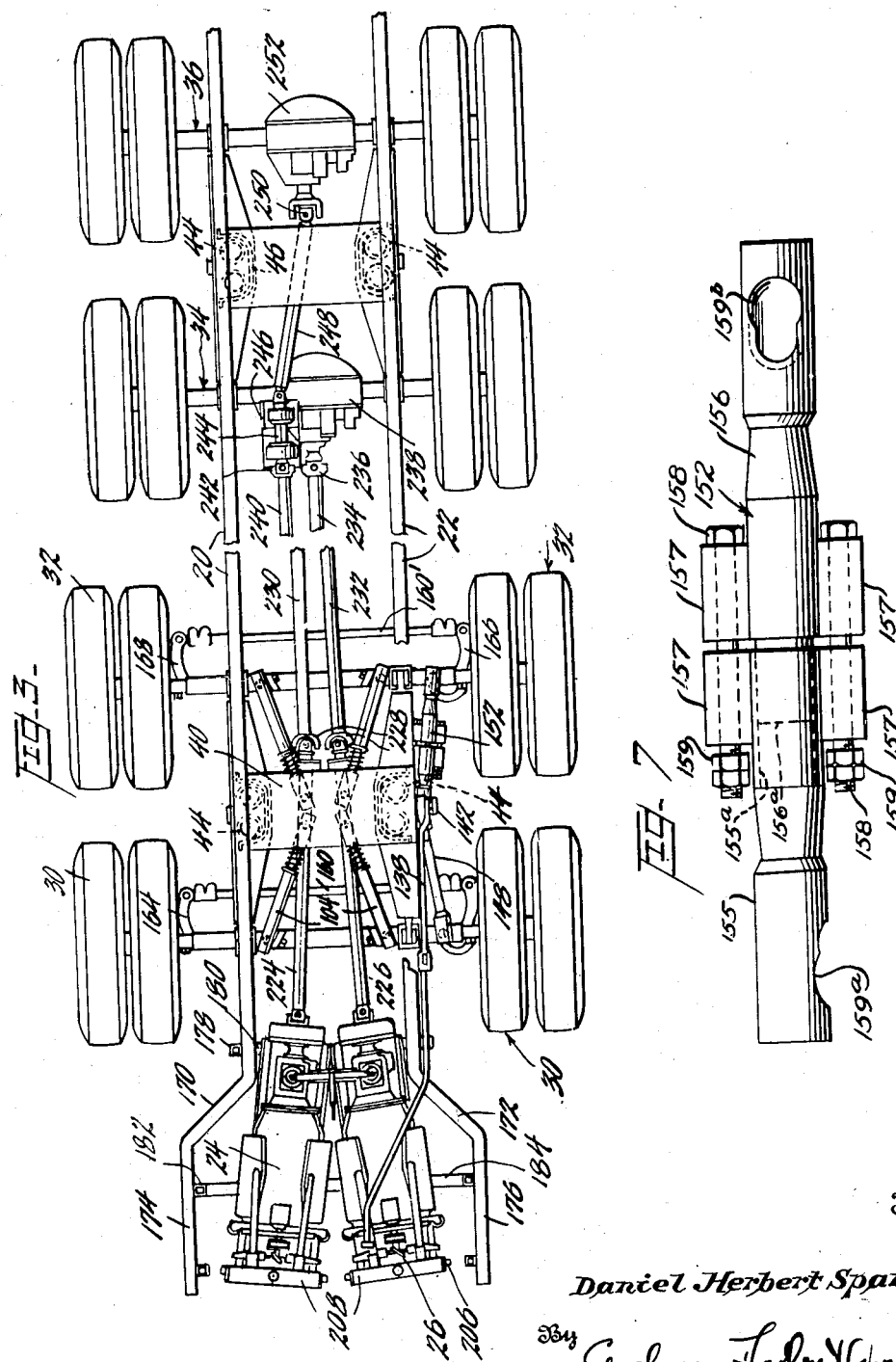
Inventor
Daniel Herbert Spangler,
Attorneys

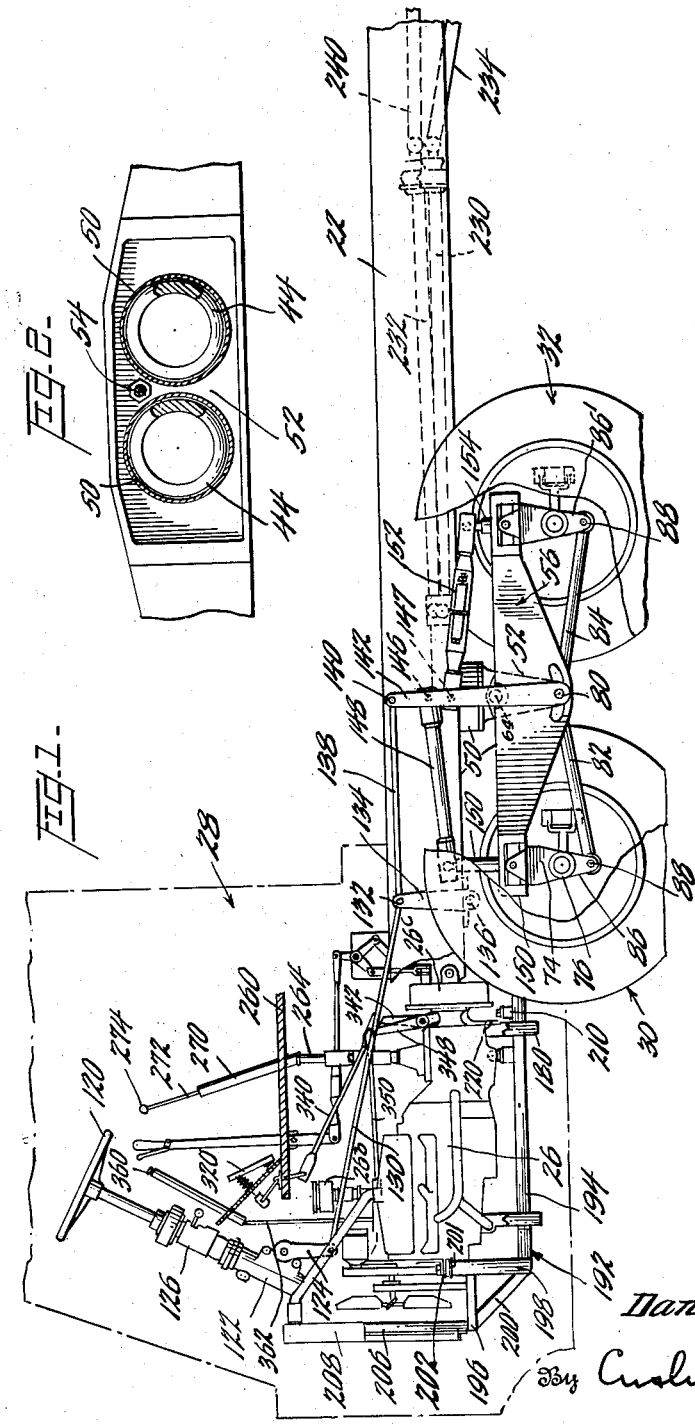

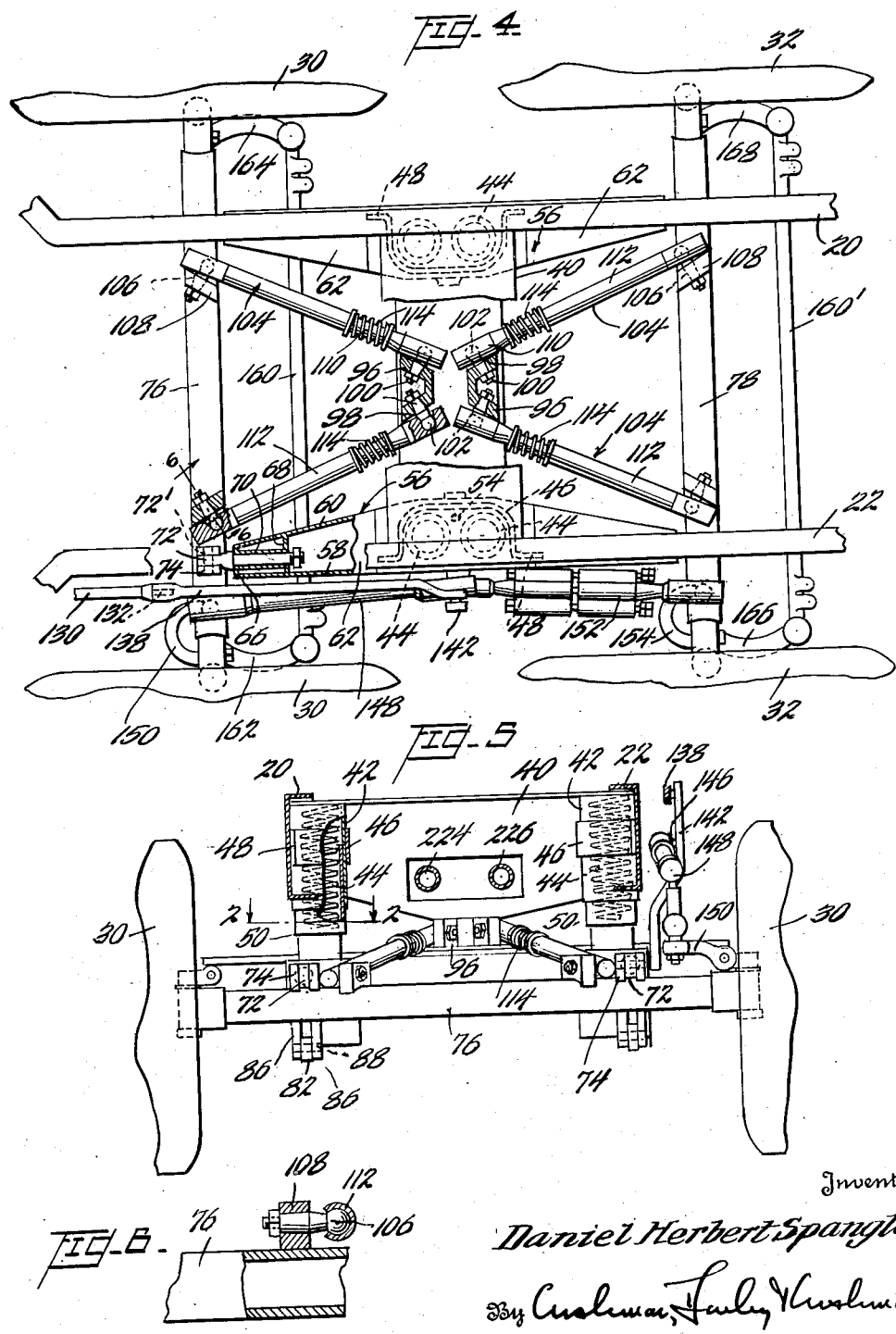

Patented May 12, 1953

2,638,355

UNITED STATES PATENT OFFICE 2,638,355

STEERING ASSEMBLY FOR TANDEM WHEEL VEHICLES

Daniel Herbert Spangler, Hamburg, Pa.

Application November 4, 1948, Serial No. 58,178

12 Claims. (Cl. 280—81.5)

1

The present invention relates to motor vehicles.

Large capacity trucks now in operation include motors, transmissions, wheels, axles and tires of substantially larger and far more expensive types than the much more numerous lower capacity trucks, for example, trucks driven by a one hundred horse power motor. For that reason, the initial cost of a large capacity truck is proportionately much greater than that of a truck of lower capacity. Also, because in the large capacity trucks, the above-mentioned parts or elements are of special design, they can only be serviced by especially trained mechanics working in especially equipped service plants. These factors make large capacity trucks proportionately more expensive to operate and maintain than trucks of lower capacity.

An object of the present invention and that of my divisional patent application Serial No. 207,611, now Patent 2,625,836, is to provide arrangements useful in a truck having a load capacity equal to the maximum load limit and size, but which truck is so designed that it may be constructed of the parts ordinarily provided upon trucks of much lower capacity.

In order to compensate for the high cost of motors and other elements of the usual high capacity truck, most operators use tractors and trailers to thereby offset high costs by increased availability of loading. This advantage is substantially offset by the lower safety factor involved in the use of trailers. In any event, because the vehicle of the present invention can be built of standard and relatively low-priced elements, the initial cost of a given number of the vehicles of the present invention will be less than, or will very favorably compare with, the cost of the number of tractors and trailers necessary to give the same availability of loading.

An object of the invention is to provide a wheel suspension for tandem axles which is so designed that weight will be equally distributed between the axles.

A further object of the invention is to provide an improved form of resilient suspension for tandem axles.

An additional object of the invention is to provide an improved arrangement for imparting steering motion to wheels arranged in tandem.

Other objects and advantages of the invention will be apparent from the following specification and accompanying drawings.

In the drawings,

Figure 1 is a side elevation of the forward portion of a truck.

2

Figure 2 is a horizontal section on the line 2—2 of Figure 5.

Figure 3 is a plan view of the truck of Figure 1 but with the central portion omitted. Figure 3 also includes a radius rod arrangement omitted from Figure 1.

Figure 4 is a plan view of an axle suspension and steering control included in the invention, with portions broken away and other portions shown in horizontal section.

Figure 5 is an end elevation of the suspension of Figure 4, the view looking toward Figure 4 from the left.

Figure 6 is a detail section on the line 6—6 of Figure 4.

Figure 7 is a bottom view of a take-up device included in the steering mechanism.

Referring to Figures 1 and 3, the truck of the present invention includes a frame formed by longitudinally extending frame members or beams 20 and 22 suitably secured together at spaced points. The longitudinal beams 20 and 22 diverge at their forward ends as indicated in Figure 3 to support motors 24 and 26 and also to support a cab 28. The overall length of the truck may be about thirty three feet, and the load carrying area, i. e., the area rearwardly of the cab, may be twenty seven feet long. Two sets 30 and 32 of front or steering wheels, arranged in tandem, respectively support the chassis at a point slightly to the rear of the cab 28. Two sets of wheels carried by driving axles 34 and 36 arranged in tandem support the rear end of the frame.

The wheels and tires are of the size normally provided upon medium-capacity trucks and the same is true of the axles. For example, the tires will have an outside diameter of about thirty-four inches and the tires of the steering wheels will be about nine inches apart at their closest point. Because all wheels are arranged in pairs, the load capacity of the truck will be correspondingly increased.

The axle suspension system of the truck is best shown in Figures 1 to 3 and 4 to 6 and is identical for both the front and rear wheels. Referring to the forward suspension, this includes a U-shaped cross beam 40 which extends between and is welded or otherwise secured to the longitudinal beams 20 and 22, as shown in Figures 4 and 5. A pair of housings 42 of cylindrical form are secured within each end of the cross beam 40 so that a pair of springs 44, one within each housing, may bear up the under surface of the horizontal element of beam 40, The housings 42 are held in fixed relation to the beams by a band 46 which embraces the housings and has its ends 48 secured to the inner surface of the vertical web of the corresponding longitudinal beams 20 and 22. As is best illustrated in Figure 4, the two springs 44 within each housing 42 are helical coil springs arranged in tandem, the axes of the springs and their fixed housings being spaced along a line extending parallel to the longitudinal beams 20 and 22. The lower end of each spring 44 is mounted in a cylindrical casing 50 as best illustrated in Figure 2. The upper ends of the casings 50 fit into the respective housings 42 and, at their lower ends, the casings 50 of each pair are secured to and support a depending bracket 52. In order to limit the downward movement of the bracket 52 and its casings 50 with respect to the housings 42 and the frame, a stay-bolt 54 is fixed at its upper end to the cross-beam 48, the lower end of the stay-bolt passing freely through an aperture in each bracket 52. Stay-bolt 54 is headed at its lower end. Provision of the headed lower end will prevent the casings 50 from moving entirely out of the housings 42.

A bolt such as 54 may extend centrally of the housings 42. In such form, as well as with the stay-bolt arrangement of Figure 2, a tension spring may be provided about the lower portion of the stay-bolt.

It will be observed from the foregoing that each bracket 52 is resiliently mounted with respect to the main frame of the truck by the action of the coil springs 44, these springs being of sufficient strength to resiliently absorb road shocks under maximum loads. As is best shown in Figure 1, each bracket 52 also serves as a pivotal support for a rocking beam 56 of the type disclosed in my Patent No. 2,403,833, issued July 9, 1946, for Suspension and Load Equalizing System for Vehicles. In more detail, each beam 56 includes spaced side walls 58 and 60 which are joined at their upper edges by top wall portions 62, the top wall portions respectively terminating at a point spaced from the bracket 52 so that the bracket may depend between the side walls of beam 56 and the latter may have pivotal movement with respect to the bracket on a horizontal axis pin 64 extending horizontally and transversely of the truck.

As is best shown in Figure 4, the inner wall 60 of each beam 56 is inclined toward the outer wall 58 and these two walls and the top wall are welded to an end wall 66. Somewhat inwardly of end wall 66 a cross web 68 is welded to the three walls 58, 60 and 62. The end plate 66 and cross web 68 are apertured on an axis longitudinal of the beam and a sleeve 70 is welded in the apertures. A pin 72 is secured in the sleeve 70, the outer end of the pin being flattened to provide vertical faces which extend between spaced lugs 74 fixed to the upper side of the beams 76 and 78 which respectively support the two sets 30 and 32 of steering wheels. A horizontally extending pin 72' pivotally connects each beam pin 72 and the lugs 74.

As is illustrated in Figure 1, each bracket 52 is provided with a pivot pin 80 adjacent its lower end which support torque rods 82 and 84 associated with the corresponding rocking beam 56 as described in my said patent. The torque rod 82 extends forwardly and is pivotally connected by a pin 88 to lugs 86 which extend downwardly from the forward axle beam 76. The other torque rod 84 extends rearwardly from pivot pin 80 and is pivotally connected at 88 between lugs 86' which project downwardly from the rearward axle 78 of the steering wheel assembly. As is explained in my above-mentioned patent, the torque rods 82 and 84 may be laterally off-set so that they will have their adjoining ends spaced upon the pin 80.

It will be observed that the suspension structure thus far described is generally similar to that disclosed in my above-mentioned patent in that it permits the forward and steering axles 76 and 78 to move vertically with respect to each other, and also permits one axle to tilt transversely with respect to the other in a plane extending crosswise of the truck. The same will be true of the rear axle housings 34 and 36. Nevertheless, throughout all such movement, the axles and axle housings will be prevented from twisting about their longitudinal axes by reason of the fact that the pivot pins 72' at the upper sides of the axles and the pivot pins 88 at the lower sides of the axles will be at the corners of a parallelogram throughout all movement of the pairs of axles and axle housings.

It will be observed that the rocking beams 56 and the lower spring casings 50 will be held parallel to the body frame members 20 and 22 by reason of the fact that two springs 44 and cylinders 42 connect the beams 56 to the main frame. In other words, complete assurance against lateral swinging of the beams 56 is given by the dual cylinder and spring mounting.

In order to further assure against turning movement of the axles and axle housings about their longitudinal axes, the radius rod arrangement illustrated in Figures 4 and 5 is also provided. Referring to those views of the front axle suspension, and which show the same radius rod arrangement used on the rear axle housings, it will be noted that ears 96 depend from a plate secured to the lower central portion of the cross beam 48 to provide vertical faces 98. The faces 98 lie in planes extending at an acute angle to the longitudinal center line of the vehicle. Each ear 96 is horizontally apertured to receive a pin 100 having a ball head 102. A telescopic radius rod 104 extends between the ball head 102 of pin 100 and a ball headed pin 106 mounted in a lug 108 secured to the corresponding axle beam 76 or 78. The pins 106 secured to the axle are normally parallel to the pins 100 fixed to the beam 48. Because the telescopic radius rods 104 extend from a point substantially midway of the width of the main frame formed by the beams 20 and 22 to points on the axles 76 and 78 just inwardly of the main frame members and the rocking beams 56, the pins 100 and 106 extend along lines at an acute angle to the main frame beams.

The telescopic radius rods 104 are formed of inner and outer members 110 and 112, respectively, the two members normally being urged apart by a coil spring 114 having one end contacting with a shoulder on the inner member 110 and its other end bearing on the adjacent end of the outer member 112. As is indicated in Figure 5, the radius rods 104 normally extend upwardly from the axles to the pins 100 and this relationship will be maintained even when the truck is fully loaded and at least so long as the truck is moving along a level surface. The springs 114 will be of sufficient strength to resist any tendency of an axle to turn about its own axis or to swing forwardly or rearwardly about a vertical pivot.

Figures 1, 3, 4 and 5 best disclose the mechanism for steering the forward sets of wheels 30 and 32. As is indicated in Figure 1, a steering wheel 120 is provided in the cab 28 of the truck and through suitable worm gearing enclosed in a housing 122 drives a steering arm 124 in the usual manner. If the truck is to be used for off-road work, a speed-change mechanism 126 may be provided in the steering column so as to enable the driver to vary the leverage applied by the steering wheel 120.

A thrust rod 130 extends rearwardly from the steering arm 124 and is pivotally connected at 132 to the upper and free end of a lever 134 pivoted on the frame beam 22 at 136. A second link 138 is connected to lever 134 on pivot 132 and extends rearwardly to a pivotal connection 140 at the upper and free end of a lever 142. Lever 142 is pivotally mounted on the pivot pin 80 which is fixed in the lower end of the bracket 52 which supports the front left-hand rocking beam 56. As has been stated above, pin 80 also serves as the central pivot for the torque rods 82 and 84 of the left-hand forward beam 56. A ball-headed stud 146 extends laterally inwardly from the lever 142 at a point near the upper end of the lever, and a link 148 extends forwardly from stud 146 to the ball head of the steering knuckle thrust arm 150 of the left stub axle of the forward set 30 of the steering wheels. A second ball-headed stud 147 (Figure 5) extends inwardly from the lever 142 somewhat below stud 146, both studs being located on the longitudinal center-line of lever 142. A link device 152 of the form shown in detail in Figure 7 extends from the stud 147 to the steering knuckle thrust arm 154 of the left stub axle of the rear set 32 of steering wheels.

A link 160 (Figure 4) connects the radius arm 162 of the left-hand stub axle of the forward steering wheels 30 with the radius rod 164 of the right-hand forward steering wheel stub axle. A link 160' similarly connects the radius arms 166 and 168 of the wheels of the rearward set 32 of steering wheels.

Figure 7 illustrates the detailed construction of the link device 152 included in the steering mechanism. Referring to that figure, it will be observed that device 152 comprises a forward element 155 provided with a rearwardly facing socket 155a. The rearward element 156 is of the same exterior diameter as the element 155 but includes a forwardly projecting reduced portion or plunger 156a which closely fits within the socket 155a. Lugs 157 project laterally from both elements and bolts 158 extend through apertures in the lugs and along lines parallel to the common axis of the elements 155 and 156. The bolts are provided with locked nuts 159 but the nuts 159 are so positioned on the bolts as to permit the elements 155 and 156 to move axially with respect to each other. For example, if the link device has a length, when extended, of the order of 25 inches between the centers of its sockets 159a and 159b, the play permitted by the bolts 158 and nuts 159 will be of the order of one-half an inch. In Figure 7, this play is shown distributed between the facing ends of the elements 155 and 156 and also between the nuts 159 and the opposed ends of the adjacent lugs 157.

Because the plunger portion 156a closely fits the socket 155a, as well as because of the close fit of the bolts 158 in the lug apertures, all relative movement of the elements 155 and 156 with respect to each other will be along a straight line. It will be observed that in normal use, the socket 159a will face outwardly to receive the inwardly projecting ball head 147, while the socket 159b will face downwardly to fit over the ball head of steering knuckle 154. All of the sockets of the steering device will be provided with the usual spring pressed elements to closely contact with the ball heads which they engage.

The particular purpose of the take-up link device 152 is as follows: I have found that when steering wheels are arranged in tandem as illustrated in Figure 1, but with no loose-connection device such as 152, some difficulty is encountered in imparting steering movement to both sets of wheels, particularly when moving along a fairly rough road or other surface. The difficulty appears to be due to a dragging action by the rear set of steering wheels and is entirely eliminated if that set of wheels has some play with respect to the forward set of wheels. In other words, if the forward set of wheels are directly connected to the steering link 142 and the rearward set are connected by a device permitting some play, the rearward set of wheels will, by reason of the lengthwise movement of the vehicle, as well as by the action of the steering device, turn to the same extent as the forward set. If either set encounters a rough spot during their turning, that will be compensated for by the play in the extensible device 152 but the total or resultant effect is that the rear wheels will still turn to the same extent as the forward wheels.

Figure 7 illustrates the normal relation of the parts of the extensible device 152. That is, when the vehicle is moving in a straight line along a smooth road, the device will be extended to median position.

I have found that steering drag is further eliminated if an extensible link device 152 is also incorporated in each of the links 160 and 160' and for the same reasons as mentioned above.

It will be noted from Figure 1 that the ball head of forward steering thrust arm lies in a vertical plane somewhat higher than the plane in which the ball head of rear thrust arm 154 is positioned. The difference in height of these planes is equal to the vertical distance between the centers of the studs 146 and 147 fixed to lever 142. Hence, with lever 142 in its median position, links 148 and 152 will lie at the same angle to a horizontal plane.

By means of the combinations of elements described above and ordinarily provided on trucks provided with a motor approximating one hundred horse power, the present truck will have a weight of the order of 15,000 pounds and will carry a pay load of the order of 33,000 pounds. The ability to handle this substantial pay load is one advantage obtained by the suspension system disclosed and the positioning of the wheel units adjacent the forward and rearward ends of the pay load carrying area, and with the motor weight forwardly of that area and the forward wheels.

It has been stated above that a truck of the present invention which is thirty-three feet in overall length will have a load carrying area twenty-seven feet long. By providing two universal joints in the steering column shaft so that the steering wheel will be horizontal and forwardly of its position shown in Figure 1, the load carrying area can be lengthened by about two-and-a-half feet without increase in overall length of the truck.

The terminology used in the specification is for the purpose of description and not of limitation,

I claim:

1. In a vehicle, a frame including longitudinal elements, a pair of beams extending parallel to the center line of the vehicle with the respective beams adjacent the elements of the frame, means to support each beam midway of its length for pivotal movement with respect to said frame about a line extending transversely of the vehicle, a pair of axle structures pivotally connected to said beams, one at each end of the beams, a pair of wheels dirigibly supported by stub axles on each axle structure of said pair, a vertically extending lever pivoted on a horizontal axis midway between the axle structures, links extending in opposite directions from the lever, a steering thrust arm carried by the stub axle of each wheel, the respective links and thrust arms being pivotally connected, and a steering control operatively connected to said lever.

2. A motor vehicle of the character described in claim 1 wherein one of said links includes a loose connection.

3. The combination described in claim 1 wherein said links are pivotally connected to said lever between the lever pivot and the connection of said steering control to said lever.

4. A vehicle of the character described in claim 1, wherein said links respectively are pivotally connected to said lever at points spaced vertically of the lever and located between the lever pivot and the connection of said steering control to said lever.

5. A vehicle of the character described in claim 1 wherein said links respectively are pivotally connected to said lever at points spaced vertically of the lever and located between the lever pivot and the connection of said steering control to said lever, and the pivotal connections between each thrust arm and the corresponding link lie in correspondingly vertically spaced horizontal planes.

6. A vehicle of the character described in claim 1 wherein each of said pair of axle structures is pivotally secured to said beams, and torque rods pivotally connect said beam supporting means and said axle structures, said torque rods being connected to said axle structures at points vertically spaced from the connection of said axle structures with said beams.

7. A vehicle of the character described in claim 1 wherein said beam supporting means includes a resilient element and said beams are bodily rigid.

8. A vehicle of the character described in claim 1 wherein the line on which said beams are pivoted is above the horizontal axis on which said vertically extending lever is pivoted.

9. In a vehicle, a frame including longitudinal elements, a pair of beam elements extending parallel to the center line of the vehicle with the respective beam elements adjacent the longitudinal elements of the frame, means to support each beam element midway of its length for pivotal movement about a line extending transversely of the frame, a pair of axle structures connected to said beam elements for rocking movement of the axle structures with respect to the beam elements in a vertical plane transverse of the vehicle, a pair of wheels dirigibly supported by stub axles on each axle structure of said pair, a steering thrust arm carried by the stub axle of each wheel, links pivotally connected to said thrust arms and extending toward each other, and means to actuate said links for steering movement including an element movable about a transverse line lying between and parallel to the axes of said axle structures.

10. A vehicle of the character described in claim 9 wherein said beam element supporting means includes a resilient element and said beam elements are bodily rigid.

11. A vehicle of the character described in claim 9 including torque rods pivotally connecting said beam element supporting means and said axle structures, said torque rods being connected to said axle structures at points vertically spaced from the connection of the axle structures with said beam elements.

12. A vehicle of the character described in claim 11 wherein the torque rods and beam elements are connected to each axle structure in the same vertical plane transversely of the vehicle.

DANIEL HERBERT SPANGLER.

References Cited in the file of this patent

UNITED STATES PATENTS

| Number | Name | Date |
|---|---|---|
| 967,728 | Charley | Aug. 16, 1910 |
| 1,412,317 | Schneider | Apr. 11, 1922 |
| 1,691,970 | Haggart | Nov. 20, 1928 |
| 1,731,557 | Wright | Oct. 15, 1929 |
| 1,802,256 | Hutt | Apr. 21, 1931 |
| 1,871,432 | Fageol | Aug. 9, 1932 |
| 1,933,674 | Marcum | Nov. 7, 1933 |
| 1,973,144 | Fageol | Sept. 11, 1934 |
| 2,027,913 | Kneale | Jan. 14, 1936 |
| 2,103,624 | Lester | Dec. 28, 1937 |
| 2,193,567 | Pointer | Mar. 12, 1940 |
| 2,224,562 | Wolf | Dec. 10, 1940 |
| 2,230,361 | Morin et al. | Feb. 4, 1941 |
| 2,292,910 | Thornton | Aug. 11, 1942 |
| 2,318,726 | Wagner | May 11, 1943 |
| 2,403,833 | Spangler | July 9, 1946 |
| 2,408,098 | Schon | Sept. 24, 1946 |

FOREIGN PATENTS

| Number | Country | Date |
|---|---|---|
| 636,122 | Germany | Oct. 2, 1936 |